May 30, 1961 K. MACLEOD 2,986,192
APPARATUS AND METHOD FOR CONNECTING COUPLINGS TO HOSE
Filed May 7, 1957 4 Sheets-Sheet 2
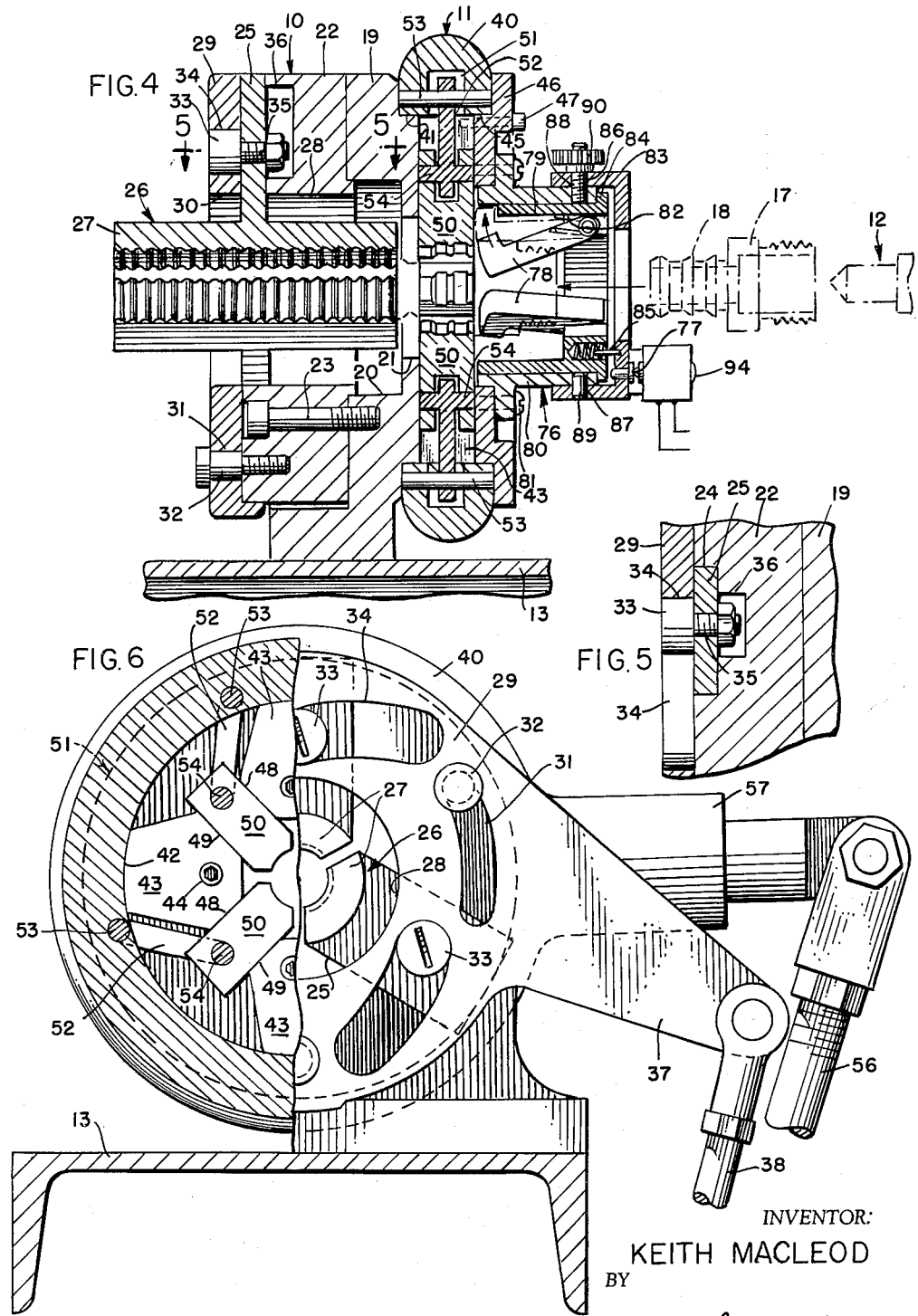
INVENTOR:
KEITH MACLEOD
BY
Marzall, Johnston, Cook + Root
ATT'YS May 30, 1961 K. MACLEOD 2,986,192
APPARATUS AND METHOD FOR CONNECTING COUPLINGS TO HOSE
Filed May 7, 1957 4 Sheets-Sheet 3
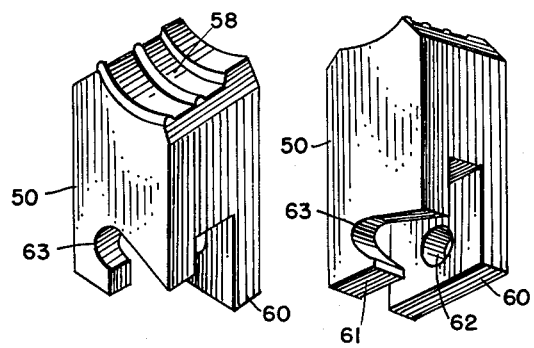
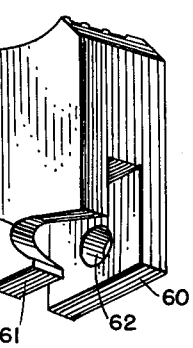
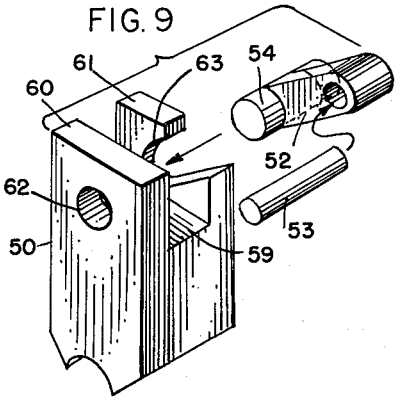
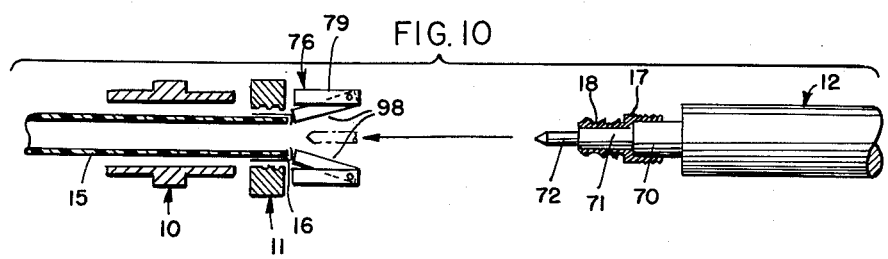
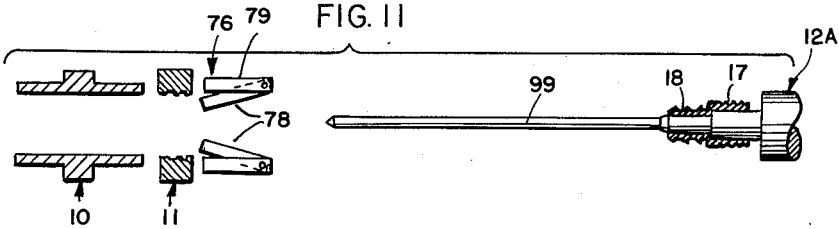
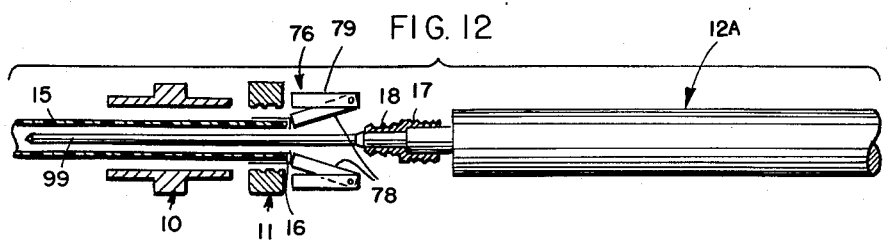
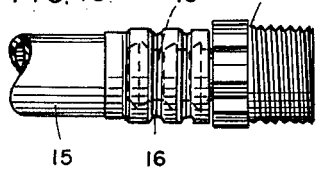
INVENTOR:
KEITH MACLEOD
BY
Marzall, Johnston, Cook & Root
ATT'YS

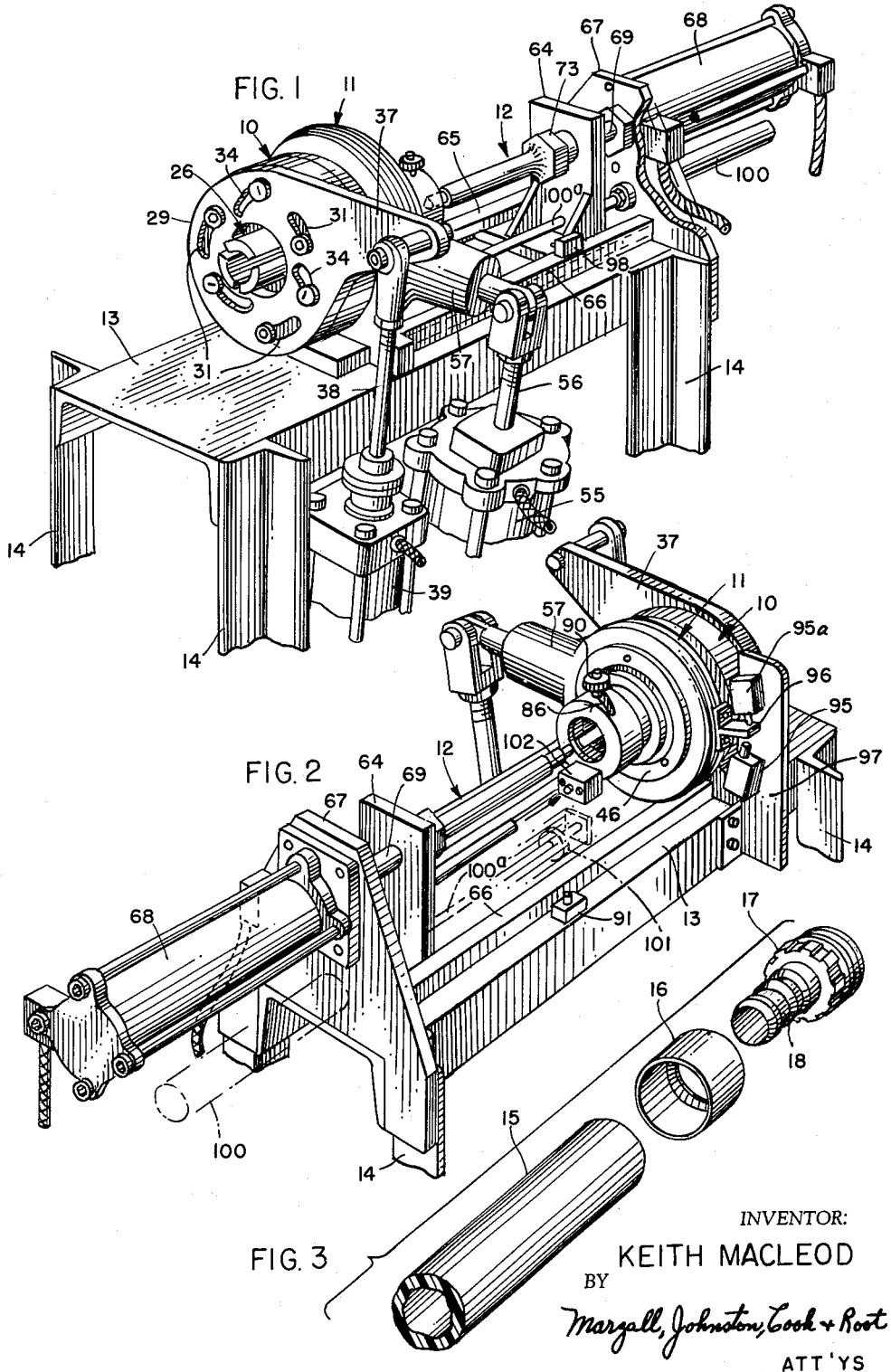

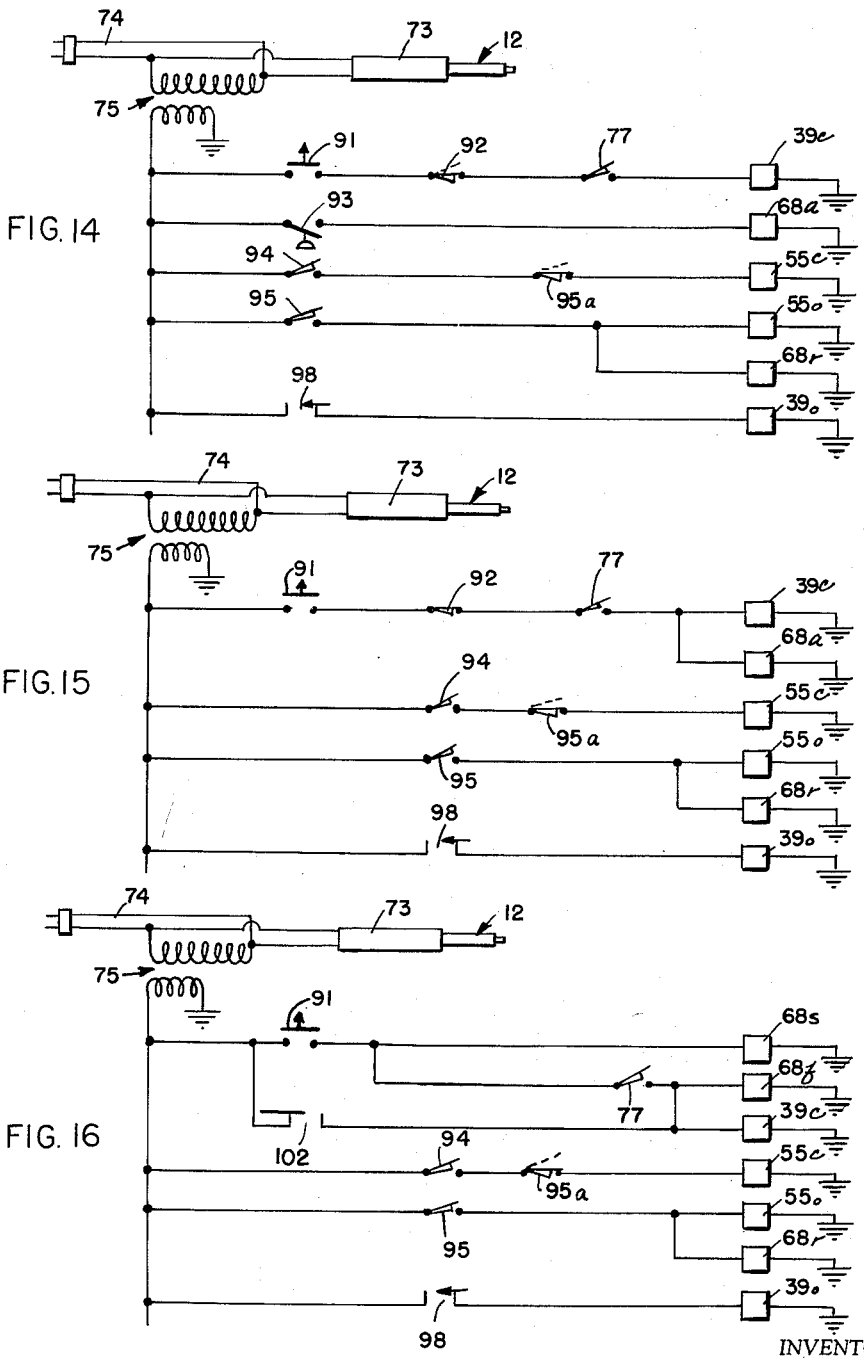

United States Patent Office 2,986,192
Patented May 30, 1961

2,986,192
APPARATUS AND METHOD FOR CONNECTING COUPLINGS TO HOSE
Keith Macleod, Santa Barbara, Calif., assignor to W. D. Allen Manufacturing Co., Chicago, Ill., a corporation of Illinois
Filed May 7, 1957, Ser. No. 657,666
6 Claims. (Cl. 153—1)

This invention relates in general to the assembling of connectors or couplings and flexible hose, and more particularly to apparatus and method for connecting couplings to plastic hose.

The method of this invention includes the steps of positioning a ferrule on the end of a flexible plastic hose, inserting a coupling into the end of the hose, and crimping the ferrule on the hose to securely connect the coupling and hose. In order to facilitate insertion of the coupling into the end of the hose, it may be heated prior to insertion. The apparatus for carrying out the method includes a vise or clamping assembly for holding the hose prior to the crimping of the ferrule. The hose with the ferrule is held so that the ferrule aligns with a crimping device. A coupling is arranged on the end of a mandrel, which is advanced to insert the coupling into the end of a hose carrying the ferrule and to hold the coupling in position during the crimping operation. The crimping device is operated to effect the crimping and the assembled hose and coupling may then be removed from the apparatus. Except for the manual positioning of the ferrule on the end of the hose and arranging of the hose in the vise and crimper and the placing of a coupling on the end of a mandrel, the operations of controlling the vise and the crimper and mandrel are carried out automatically.

Accordingly, it is an object of this invention to provide a method and apparatus for connecting a coupling to the end of a flexible hose.

Another object of this invention resides in the provision of a machine capable of automatically connecting a coupling to the end of a flexible hose.

Still another object of this invention is in the provision of a compact machine for assembling couplings on the ends of flexible hoses which is simply constructed and may be easily operated with a minimum of instruction.

A further object of this invention is to provide a quick clamp type vise for use in rigidly holding flexible hose against longitudinal movement.

Other objects, features, and advantages of the invention will be apparent from the following detailed disclosure, taken in conjunction with the accompanying sheets of drawings, wherein like reference numerals refer to like parts in which:

Fig. 1 is a perspective view looking a tone side and to the right of the machine according to the invention, with some parts broken away and other parts fragmentary for purposes of clarity;

Fig. 2 is a perspective view looking at the other side of the machine according to the invention, with some parts removed and other parts shown in phantom for purposes of clarity;

Fig. 3 is an exploded view of a piece of hose, a ferrule and a coupling which may be assembled with the machine of the present invention;

Fig. 4 is an axial sectional view, taken through the vise and crimper of the coupling machine;

Fig. 5 is a detailed sectional view, taken substantially along line 5—5 of Fig. 4;

Fig. 6 is an elevational view looking toward the end of the vise, with parts broken away to show the inner working parts of the vise, and other parts broken away to show the inner working parts of the crimper;

Fig. 7 is a perspective view of a die employed in the crimper;

Fig. 8 is another perspective view of the die of Fig. 7 only looking at it from a different angle;

Fig. 9 is a perspective and exploded view of a crimping die and illustrating its mounting member;

Fig. 10 is a more or less diagrammatic view, partly sectional, and fragmentary, to illustrate the manner of arranging the flexible hose and ferrule with respect to the vise and crimper and how the mandrel with the coupling mounted thereon is advanced to insert the coupling within the end of the flexible hose;

Fig. 11 is a view similar to Fig. 10 but illustrating a modified form of mandrel used to handle couplings of a smaller size;

Fig. 12 is a view similar to Fig. 11 but disclosing the mandrel in an advanced position within the end of a hose and ferrule arranged in the vise and crimper;

Fig. 13 is a perspective view of an assembled hose and coupling;

Fig. 14 is a schematic view of an electrical circuit for the machine of the present invention;

Fig. 15 is a schematic view of a modified electric circuit for the machine of the present invention; and Fig. 16 is a schematic view of still another modified electrical circuit for operating the machine of the present invention and especially the modification of Figs. 11 and 12.

Couplings are connected to hoses by the machine of the present invention which generally includes a vise or clamping device 10, Figs. 1 and 2, for holding the end of a hose, stationary, a crimper 11 for crimping the ferrule on the hose, and a mandrel 12 which supports the coupling initially and inserts it into the end of the hose and supports it therein during the crimping operation. The vise, crimper and mandrel and their operating components are mounted on a base plate or table 13 supported from the floor by upstanding legs 14.

Referring now to Fig. 3, the parts prior to assembly on the machine include a length of hose 15, a ferrule 16 which telescopes over the end of the hose, and a male coupling 17. The coupling 17 includes a serrated tail 18 which is inserted into the end of the hose. After the ferrule has been crimped, the completed and assembled product is like that shown in Fig. 13.

Both the vise 10 and the crimper 11 are secured to an upstanding frame member 19 mounted on the top of the base plate 13, with the vise being secured to one side and the crimper secured to the other side thereof, Fig. 4. Stepped counterbores 20 and 21 are provided in the frame member 19 for purposes which will be more clearly understood hereinafter, and for communicating the vise with respect to the crimper.

The vise 10 includes a cylindrical stationary part 22 secured to one side of the frame member 19 by a plurality of bolts 23 (only one shown), Figs. 4 and 5. On the vertical face of the part 22 opposite the side connected to the frame member 19, a plurality of radially positioned and extending grooves or slideways 24 each slidably receive a supporting arm 25 of a clamping member 26. Each clamping member 26 is somewhat T-shaped and includes an elongated jaw 27 at right angles to the supporting arm 25 and which extends through a center aperture 28 formed in the stationary part 22 as well as into the counterbore 20 of the frame member 19. In the instant case, three such clamping members 26 are provided to define a triple-jaw vise, although more or less clamping members may be utilized depending upon the desires of the particular user. Each clamping member, by having an elongated jaw 27 engages a substantial amount of the hose which is positioned therein to enhance the gripping effectiveness of the vise. Further, the gripping surfaces of these jaws are transversely corrugated to increase the resistance of the longitudinal pressure subjected to the hose when inserting the coupling into the end thereof. This pressure is considerable since the outside diameter of the coupling is greater than the inside diameter of the hose thereby permitting full flow of the hose when assembled and enhancing the grip of the hose on the coupling.

The supporting arms 25 of the clamping members are held in their respective grooves 24 by a substantially disc-shaped actuating member 29 which also serves to radially position the clamping members into clamping and unclamping positions. This actuating member includes a central aperture 30 aligned with the aperture 28 of the part 22, and a plurality of circumferentially spaced slots 31 which are concentric to the aperture 30. Each slot 31 slidably engages a shoulder screw 32 which not only holds the actuating plate against the stationary part 22, but mounts the actuating plate so that it may be rotated within the limits of the slot 31. Secured to the supporting arms 25 of the clamping members 26 so that the jaws 27 may be radially arranged by actuation of the actuating member 29 is a cam follower 33 engageable in a camming slot 34 of the actuating member 29. Each camming slot in the actuating member 29 is arranged to have one end adjacent the aperture 30 and the other end adjacent the outer periphery of the actuating member 29 so that oscillation of the actuating member 29 will cause radial movement of the jaws 27 inward and outward. The cam followers 33 are secured to the supporting arms 25 of the clamping members by a nut and bolt arrangement 35, and a radially extending slot 36 is arranged in the bottom of each groove 24 of the stationary part 22 to accommodate movement of the nut of each cam follower, Figs. 4 and 5.

As seen in Figs. 1, 2, and 6, an actuating arm 37 is connected to the actuating member 29, and in turn connected to a piston rod 38 of a double-acting pneumatic cylinder 39. The pneumatic cylinder is mounted on the base of the machine and actuation thereof accordingly effects actuation of the vise 10.

The crimper 11 includes an annular actuating member 40, Fig. 4, rotatably mounted on an annular shoulder 41 formed on the frame member 19, the outer circumferentially aligned peripheral faces 42 of guide blocks 43 (Fig. 6) which are secured to the frame member 19 by fasteners 44, and the annular shoulder 45 formed on the die retainer plate 46 which is held in place and secured to the guide blocks 43 by bolts 47. As seen in Fig. 6, each guide block 43 is also provided with slide faces 48 and 49 which respectively coact with slide faces 49 and 48 of adjacent guide blocks for slidably receiving crimping dies 50 and maintaining them slidable along a radius of the annular actuating member 40. The annular actuating member 40 has a cross section of generally U-shape which defines an inwardly opening annular groove 51, Fig. 4, that freely receives one end of a plurality of over center toggle links 52 which are pivotally mounted on pins 53 transverse the groove 51. The link 52 is T-shaped, Figs. 4 and 9, and includes a cross shaft 54 which pivotally mounts each crimping die 50. Each guide block 43 is formed to provide adequate clearance between adjacent guide blocks so that upon actuation of the annular member 40, when the over center toggle links swing from one extreme position as shown in Fig. 6 to an opposite extreme position, the crimping dies will be driven radially inwardly and again radially outwardly to the position as shown in Fig. 6.

Actuation of the annular member 40 is accomplished by a double acting pneumatic cylinder 55, Fig. 1, having a piston rod 56 pivotally connected to the outer end of an actuation arm 57 integral with the annular ring 40. Thus, actuation of the pneumatic cylinder 55 effects actuation of the crimper 11.

Each crimping die 50, Fig. 7, is generally elongated and block-shaped and has at one end an arcuate crimping face 58 which may include any number of adjacent ridges and recesses to provide the desired crimp of the ferrule. And since a plurality of these crimping dies, four in the instant case, are arranged radially at 90° from each other, the arcuate faces 58 coact to crimp the cylindrical ferrule around its entire circumference. The other end of each crimping die is formed so that the crimping dies may be easily removed from their respective toggle links 52 and cross shaft 54 to facilitate substituting crimping dies of another size for performing crimping operations on a different sized ferrule. This end of the crimping die, as seen in Figs. 7, 8, and 9, is slotted longitudinally at 59 to define supporting legs 60 and 61 having aligned bores 62 and 63, respectively. The bore 63 in the leg 61 is open at one side with a portion of the leg being removed so that the main body of each toggle link 52 will clear this leg when the link and die are angularly related to each other as seen in Fig. 9 thereby permitting removal or insertion of the crimping die 50 on the toggle link 52.

Referring again to Fig. 4, it will be seen that the crimping dies 50 of the crimper 11 are arranged in somewhat coalignment with the clamping jaws 27 of the vise 10 so that insertion of a length of hose having a ferrule on the end thereof into the vise 10 will guide the hose properly into the crimper 11.

The mandrel 12 is mounted on a horizontally movable vertically arranged supporting block 64, Figs. 1 and 2, which is slidably mounted between parallel spaced tracks 65 and 66 secured to the top of the base plate 13 in such a manner that the center line of the mandrel 12 is coaxially aligned with the center lines of the vise 10 and crimper 11. A vertically upstanding supporting plate 67 is carried on the adjacent end of the base plate 13 for supporting in substantially horizontal position a double-acting pneumatic cylinder 68 having a piston rod 69 suitably connected to the slidable block 64.

The mandrel 12 is formed on its free end with a plurality of progressively smaller stepped cylindrical portions 70, 71, and 72, the latter being preferably pointed to enhance entrance of the mandrel within the end of a hose and ferrule, as seen in Fig. 10. The adjacent stepped cylindrical portions 70 and 71 define therebetween an annular shoulder or stop against which the coupling 17 may abut against thereby assuring that the coupling 17 will be manually mounted on the mandrel 12 in the same manner at each mounting and will not be permitted to move axially along the mandrel. The stepped cylindrical portions 70 and 71 are sized so that the portion 70 snugly supports the threaded end of the coupling and the portion 71 snugly supports the tail piece of the coupling thereby assuring proper positioning of the coupling within the end of the hose and relative to the ferrule during the crimping of the ferrule by the crimper 11. The smallest cylindrical portion 72 merely guides the mandrel into the end of the hose in such cases where the end of the hose and ferrule might be slightly misaligned with respect to the center axis of the mandrel 12.

Since the insertion of a coupling into the end of a hose would be easier if the hose was in its most pliable condition, and this condition could be enhanced by heating the hose, the coupling is heated on the end of the mandrel by means of a thermostatically controlled heater 73 secured on the mandrel, Fig. 1 and the schematic diagrams.

As seen in the schematic diagrams of Figs. 14, 15, and 16, the thermostatically controlled heater 73 of the mandrel 12 may be connected to a suitable source of electric current such as 110 v.a.c. indicated by the numeral 74. This electrical source is also connected to a step down transformer 75 for operating solenoid valves on the pneumatic cylinders 39, 55, and 68 automatically through a cycle of operation. Thus, the operation of the pneumatic cylinders is controlled by conventional solenoid operated valves, which are in turn actuated by microswitches arranged on the components of the machine to effect an automatic operation thereof. In the schematic diagrams, the solenoid actuated valves on the pneumatic cylinder 39 for opening and closing the vise 10 are respectively designated as 39o and 39c, while the valves on the pneumatic cylinder 68 which respectively advance and retract the mandrel 12 are designated as 68a and 68r, and the valves on the pneumatic cylinder 55 for opening and closing the crimper 11 are designated as 55o and 55c, respectively.

The assembling of a hose and coupling according to the present invention first involves the step of manually arranging a ferrule on the end of a hose such as the ferrule 16 on the end of the hose 15 as seen in Fig. 10. The hose and ferrule are then inserted into the outer end of the vise 10 between the jaws 27 and extended inwardly into the confines of the crimper 11 until the ferrule 16 engages a ferrule stop 76 which thereby closes a normally open ferrule microswitch 77, Figs. 4 and 14.

The ferrule stop 76, Fig. 4, comprises a plurality of circumferentially arranged fingers 78 pivotally mounted on a ring 79 telescopically slidable within a stationary supporting ring 80, the latter being fixed to the die retainer plate 46 of the crimper 10 by fasteners 81. Each finger 78 is normally biased by a spring 82 into the path of the ferrule 16 so that the ferrule will engage the fingers 78 and slide the ring 79 in a direction away from the crimper 11. As the ring 79 moves away from the crimper 11, it engages the ferrule microswitch 77 which is mounted on a ring 83 that is telescopically received in adjusted position over the outer end of the stationary supporting ring 80. The slidable ring 79 is flanged at its outer end at 84 thereby defining a shoulder against which ring 80 may abut to prevent or limit the inward movement of ring 79 towards the crimper 11, and to provide an outer end face to engage the microswitch 77. A plurality of springs 85 are interposed between the slidable ring 79 and the adjusting ring 83 to retract the ring 79 to its normal position once the ferrule 16 has been removed from contact with the fingers 78. To adjust the position of the adjusting ring 83, a pair of circumferentially extending and diametrically opposed slots 86 and 87 are formed in the adjusting ring 83 engageable with a threaded stud 88 and a threadless stud 89, respectively. Actually, the slots 86 and 87 are slightly angularly related to the inner and outer ends of the ring 83 so that the rotation of the ring relative to the stationary supporting ring 80 will effect axial movement thereof inwardly and outwardly from the crimper 11. A knurled nut 90 is received on the threaded stud 88 for locking the adjusting ring 83 to the stationary ring 80 when the proper spacing of the microswitch 77 from the engaging flange 84 is obtained. As the coupling 17 is inserted into the end of the hose by the mandrel 12, the coupling will engage the fingers 78 and urge them outwardly out of the path of the mandrel and coupling so that the coupling may be then continued inwardly into the hose. After the coupling and hose have been removed, the fingers 78 are forced to their inner position as shown in solid lines in Fig. 4 by the biasing of the springs 82.

After the hose and ferrule have been properly positioned to close the normally open ferrule microswitch 77, pressing of the start button 91 initiates the cycle of operation for assembling the hose and coupling. Of course, the coupling 17 would have been positioned on the mandrel 12 prior to the pressing of the start button 91. The start button 91 may be positioned at any suitable place on the base plate 13 such as at the front of the machine as shown in Fig. 2. The usual type of holding circuit may be arranged in cooperation with the start button 91 so that the button need not be held in a depressed position until the vise is completely closed. In order to preclude the possibility of disrupting the automatic cycle should the start button 91 be accidentally depressed after the cycle has been initiated, when the vise closes to grip the hose 15, a normally closed microswitch 92 is actuated which opens when the vise is in the "on" position to render the start button circuit thereafter inoperative. Thus, insertion of the hose and ferrule to engage and close switch 77 and pressing of the start button 91 operates the solenoid valve 39c to cause the pneumatic cylinder 39 to close the vise 10 and rigidly grip the hose 15 for the crimping operation.

After the vise has closed about the hose 15, pressure builds up in the pneumatic system to thereby close a normally open pressure switch 93 that actuates the solenoid valve 68a which operates the pneumatic cylinder 68 to advance the mandrel and coupling for inserting the coupling 17 into position in the end of the hose. When the mandrel has reached its innermost position so that the coupling 17 is properly arranged with respect to the hose 15 and ferrule 16, a normally open microswitch 94 is closed to actuate the solenoid valve 55c which causes the pneumatic cylinder 55 to close the crimper 11. A normally closed microswitch 95a on the plate 97 is opened following closing of the switch 94 breaking the circuit of valve 55c so that valve 55o is free to operate. In closing the crimper 11, the pneumatic cylinder 55 forces the piston rod 56 upwardly and the annular actuating ring 40 in a counterclockwise direction looking at Fig. 6 to cause the crimping dies 50 to move radially inwardly and outwardly at the end of the stroke. When the annular actuating member 40 has been rotated a predetermined distance to cause the crimping dies to move radially inwardly and again radially outwardly, a microswitch 95 is actuated by a lug 96 mounted on the annular member 40, Fig. 2, and as seen in Fig. 14, thereby causing the solenoid valves 55o and 68r to be operated and the pneumatic cylinders 55 and 68 to simultaneously return the crimper to its original position and retract the mandrel from the coupling. The microswitch 95 is mounted on a plate 97 carried by the base plate 13 as seen in Fig. 2. As the crimper 11 is opened, the annular actuating ring 40 will be rotated in a clockwise direction as seen in Fig. 6 to thereby cause the crimping dies to first move inwardly against the ferrule and then again outwardly to the position as seen in Fig. 6. As the mandrel 12 retracts to its initial position for the next operation, a microswitch 98 (normally open) will be momentarily closed to energize the solenoid valve 39o and cause the pneumatic cylinder 39 to open the jaws 27 of the vise 10. The microswitch 98 will then open before the mandrel is fully retracted to permit the vise to close on the succeeding cycle. The hose and now connected couplings may then be removed from the machine. The microswitch may be mounted on one of the tracks such as at track 66, Fig. 1, and actuated by the block 64 of the mandrel 12. Accordingly, after the start button 91 has been depressed, a completely automatic cycle of operation is effected by the machine to connect the coupling to the hose, assuming that a coupling has been mounted on the mandrel 12 and that a ferrule has been arranged on the end of the hose which has been placed within the vise 10 and the crimper 11. Generally, these steps include advancing the mandrel with a coupling thereon to insert the coupling into the end of the hose, crimping the ferrule over the hose and tail piece of the coupling, removing the mandrel from the coupling and releasing the vise so that the assembly may be removed from the machine.

A different electrical circuit, Fig. 15, may be employed to bring about substantially the same operation as the one shown in Fig. 14, except that the solenoid valve 39c and the advance mandrel valve 68a are energized simultaneously. Thus, in this embodiment, the pressure switch 93 has been eliminated. Otherwise the operation of this electrical circuit effects the same operations of the machine parts.

Referring now to another embodiment of the invention, Figs. 11 and 12, it is seen that the mandrel 12A is the only different part, wherein it is adapted for inserting smaller couplings into smaller hoses. Small diameter hose is accommodated with this arrangement wherein the mandrel advance is interrupted. The mandrel 12A is equipped with a long thin extension 99 which in its initial position allows the coupling to be placed in position on the mandrel. The mandrel is then advanced to a position, as seen in Fig. 12, where the hose can be started over the extension 99, thus assuring reliable entry of the coupling into the hose. The mandrel is stopped at the hose loading position by a conventional hydrocheck 100 having a solenoid release valve 68f. The hydrocheck may be mounted on the machine as seen in Fig. 2 in phantom. An adjustable stop 101 on the piston rod 100a of the hydrocheck is engaged by the mandrel support 64 and holds the mandrel against further advance.

The electrical circuit for operating this embodiment is shown in Fig. 16. After the coupling has been positioned on the mandrel, pressing of the start button 91 energizes the solenoid valve 68s to advance the mandrel to the hose loading position as seen in Fig. 12. The hydrocheck with a solenoid operated release valve 68f prevents full advance of the mandrel. After the hose and ferrule are positioned over the mandrel and within the vise and crimper, the ferrule switch 77 is closed and pressing of the start button 91 operates the solenoid valves 68f and 39c to release the hydrocheck and close the vise. A slight forward movement of the mandrel support 64 closes a normally open holding switch 102 for maintaining the valve 68f open during the remaining part of the mandrel advance whereby the mandrel inserts the coupling into the end of the hose. Upon reaching the full advance position, the mandrel actuates the normally open microswitch 94 which energizes the solenoid valve 55c of the cylinder 55 to close the crimper 11. As in the other embodiments, when the crimper has reached its closed position, the microswitch 95 is closed to energize the solenoid valve 55o and solenoid valve 68r to effect opening of the crimper and retracting of the mandrel to its original position. As the mandrel retracts, its support 64 strikes the normally open microswitch 98 to effect actuation of the solenoid valve 39o of the cylinder 39 and open the vise so that the assembled hose and coupling may be removed from the machine.

It will be understood that modifications and variations may be effected without departing from the scope of the novel concepts of the present invention, but it is understood that this application is to be limited only by the scope of the appended claims.

The invention is hereby claimed as follows:

1. Apparatus for securing a coupling to the end of a hose comprising, means for selectively clamping the hose to a stationary member, means for supporting a coupling and inserting the coupling into the end of the hose, means for crimping a ferrule over the hose end thereby connecting the hose and coupling together, said crimping means including a plurality of radially arranged crimping dies engaging the circumferential surface of a ferrule during the crimping thereof, and means for actuating said clamping means, said supporting means, and said crimping means sequentially and automatically through a cycle of operation which secures the coupling to the hose.

2. A machine for connecting a hose and coupling together comprising, a base, a vise mounted on said base for clamping a hose thereto, means for driving said vise, a crimper mounted on said base adjacent said vise and aligned therewith, means for driving said crimper, a mandrel adapted to support a coupling, the center axis of said mandrel aligning with the center axes of said vise and crimper, means for driving said mandrel along the center axes of said vise and crimper to insert the coupling into the end of the hose and support it therein, and means for actuating said vise, crimper and mandrel driving means sequentially and automatically through a cycle of operation to secure the coupling to the hose.

3. A machine for connecting a hose and coupling together comprising, a base, a vise mounted on said base for clamping a hose thereto, means for driving said vise, a crimper mounted on said base adjacent said vise and aligned therewith, means for driving said crimper, a mandrel adapted to support a coupling, the center axis of said mandrel aligning with the center axes of said vise and crimper, means for driving said mandrel along the center axes of said vise and crimper to insert the coupling into the end of the hose and support it therein, and electrical circuit means for actuating said vise, crimper and mandrel driving means sequentially and automatically through a cycle of operation to secure the coupling to the hose.

4. Apparatus for connecting a hose and coupling together by crimping a ferrule over the hose, whereby the hose is telescopically arranged over one end of the coupling and the ferrule is telescopically arranged over the hose and coupling, which comprises a base, a vise mounted on said base for gripping said hose, a pneumatic cylinder for actuating said vise, a crimper mounted on said base adjacent to said vise, the center axes of said vise and crimper being coaligned, a pneumatic cylinder for actuating said crimper, a mandrel reciprocably mounted on said base and having its longitudinal axis in alignment with the axes of said vise and crimper, a pneumatic cylinder for reciprocating said mandrel, and means for sequentially and automatically operating said pneumatic cylinders through a cycle of operation to secure the coupling and hose together.

5. Apparatus for connecting a hose and coupling together by crimping a ferrule over the hose, whereby the hose is telescopically arranged over one end of the coupling and the ferrule is telescopically arranged over the hose and coupling, which comprises a base, a vise having radially movable gripping members mounted on said base for gripping said hose, a pneumatic cylinder for actuating said vise, a crimper having radially movable crimping dies mounted on said base adjacent to said vise, the center axes of said vise and crimper being coaligned, a pneumatic cylinder for actuating said crimper, a mandrel reciprocably mounted on said base and having its longitudinal axis in alignment with the axes of said vise and crimper, said mandrel having an abutment against which a coupling may abut and an extension terminating in a free end spaced from said abutment, a pneumatic cylinder for reciprocating said mandrel, means for stopping the mandrel advance at a position wherein the extension is arranged within the crimper and vise to serve as a guide when inserting the hose and ferrule within the vise and crimper, and means for sequentially and automatically operating said pneumatic cylinders through a cycle of operation to secure the coupling and hose together.

6. The apparatus of claim 5, and heater means on said mandrel for heating the coupling placed thereon to facilitate insertion of the coupling into the end of the hose.

References Cited in the file of this patent

UNITED STATES PATENTS

| | | |
|---|---|---|
| 758,195 | Schweinert | Apr. 26, 1904 |
| 807,738 | Fullerton et al. | Dec. 19, 1905 |
| 1,296,222 | Russ | Mar. 4, 1919 |
| 1,945,777 | Heidloff | Feb. 6, 1934 |
| 2,070,898 | Hall | Feb. 16, 1937 |

(Other references on following page)

UNITED STATES PATENTS

| | | |
|---|---|---|
| 2,231,278 | Miller | Feb. 11, 1941 |
| 2,292,421 | Wolf | Aug. 11, 1942 |
| 2,299,055 | Hoffman et al. | Oct. 13, 1942 |
| 2,433,546 | Cornelius | Dec. 30, 1947 |
| 2,483,659 | Miller | Oct. 4, 1949 |
| 2,593,706 | Zelewsky | Apr. 22, 1952 |
| 2,649,886 | Palmer | Aug. 25, 1953 |
| 2,660,780 | Beck | Dec. 1, 1953 |
| 2,676,391 | Elder | Apr. 27, 1954 |
| 2,679,913 | Scott | June 1, 1954 |
| 2,735,473 | Diget | Feb. 21, 1956 |
| 2,776,842 | Marsden | Jan. 8, 1957 |